(12) United States Patent
Forrer, Jr. et al.

(10) Patent No.: US 7,478,220 B2
(45) Date of Patent: Jan. 13, 2009

(54) METHOD, APPARATUS, AND PRODUCT FOR PROHIBITING UNAUTHORIZED ACCESS OF DATA STORED ON STORAGE DRIVES

(75) Inventors: Thomas Richard Forrer, Jr., Round Rock, TX (US); Jason Eric Moore, Austin, TX (US); Abel Enrique Zuzuarregui, Paige, TX (US)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 11/165,048

(22) Filed: Jun. 23, 2005

(65) Prior Publication Data
US 2006/0294331 A1 Dec. 28, 2006

(51) Int. Cl.
*G06F 12/00* (2006.01)
*G06F 13/00* (2006.01)
*G06F 13/28* (2006.01)
(52) U.S. Cl. ................. 711/173; 711/111; 726/34
(58) Field of Classification Search .......... 711/173; 713/187–194; 726/34
See application file for complete search history.

(56) References Cited

U.S. PATENT DOCUMENTS

| | | | | |
|---|---|---|---|---|
| 4,993,029 A * | 2/1991 | Galbraith et al. | ............ | 714/769 |
| 5,949,882 A * | 9/1999 | Angelo | ............ | 713/185 |
| 6,073,234 A * | 6/2000 | Kigo et al. | ............ | 713/161 |
| 6,392,829 B1 * | 5/2002 | Stoutenburgh et al. | ............ | 360/39 |
| 6,449,688 B1 * | 9/2002 | Peters et al. | ............ | 711/112 |
| 6,678,822 B1 * | 1/2004 | Morar et al. | ............ | 713/182 |
| 6,694,419 B1 * | 2/2004 | Schnee et al. | ............ | 711/173 |
| 6,725,178 B2 * | 4/2004 | Cheston et al. | ............ | 702/186 |
| 6,738,886 B1 * | 5/2004 | Mendoza et al. | ............ | 711/173 |
| 6,820,207 B2 * | 11/2004 | Dawkins et al. | ............ | 713/324 |
| 2002/0046359 A1 * | 4/2002 | Boden | ............ | 714/6 |
| 2002/0051273 A1 * | 5/2002 | Phua et al. | ............ | 359/200 |
| 2002/0191796 A1 * | 12/2002 | Muschenborn | ............ | 380/277 |
| 2003/0070083 A1 * | 4/2003 | Nessler | ............ | 713/193 |
| 2003/0161467 A1 * | 8/2003 | Cheng et al. | ............ | 380/44 |
| 2003/0182566 A1 * | 9/2003 | Kohara et al. | ............ | 713/193 |
| 2003/0221077 A1 * | 11/2003 | Ohno et al. | ............ | 711/165 |
| 2004/0002999 A1 * | 1/2004 | Rand | ............ | 707/104.1 |
| 2004/0003275 A1 * | 1/2004 | Nakada et al. | ............ | 713/193 |
| 2004/0030893 A1 * | 2/2004 | Karamchedu et al. | ............ | 713/168 |
| 2004/0083481 A1 * | 4/2004 | Shultz et al. | ............ | 719/312 |
| 2004/0199533 A1 * | 10/2004 | Celis et al. | ............ | 707/101 |
| 2006/0087760 A1 | 4/2006 | Forrer, Jr. et al. | | |

* cited by examiner

*Primary Examiner*—Matt Kim
*Assistant Examiner*—Christopher D Birkhimer
(74) *Attorney, Agent, or Firm*—Duke W. Yee; Diana R. Gerhardt; Lisa L. B. Yociss

(57) ABSTRACT

A method is disclosed in a data processing system for prohibiting unauthorized access of data that is stored on storage drives. Multiple logical partitions are generated. A different unique randomizer seed is associated with each one of the logical partitions. In response to one of the logical partitions needing to access a storage drive, the logical partition transmits a seed to the storage drive. The transmitted seed is associated with the one of the logical partitions. A transmitting one of the logical partitions is unable to transmit a seed that is other than a seed that is associated with the transmitting one of the logical partitions. The storage drive utilizes the transmitted seed to randomize and de-randomize data for the one of the logical partitions. Data randomized for one of the logical partitions cannot be de-randomized for a different one of the logical partitions.

7 Claims, 9 Drawing Sheets

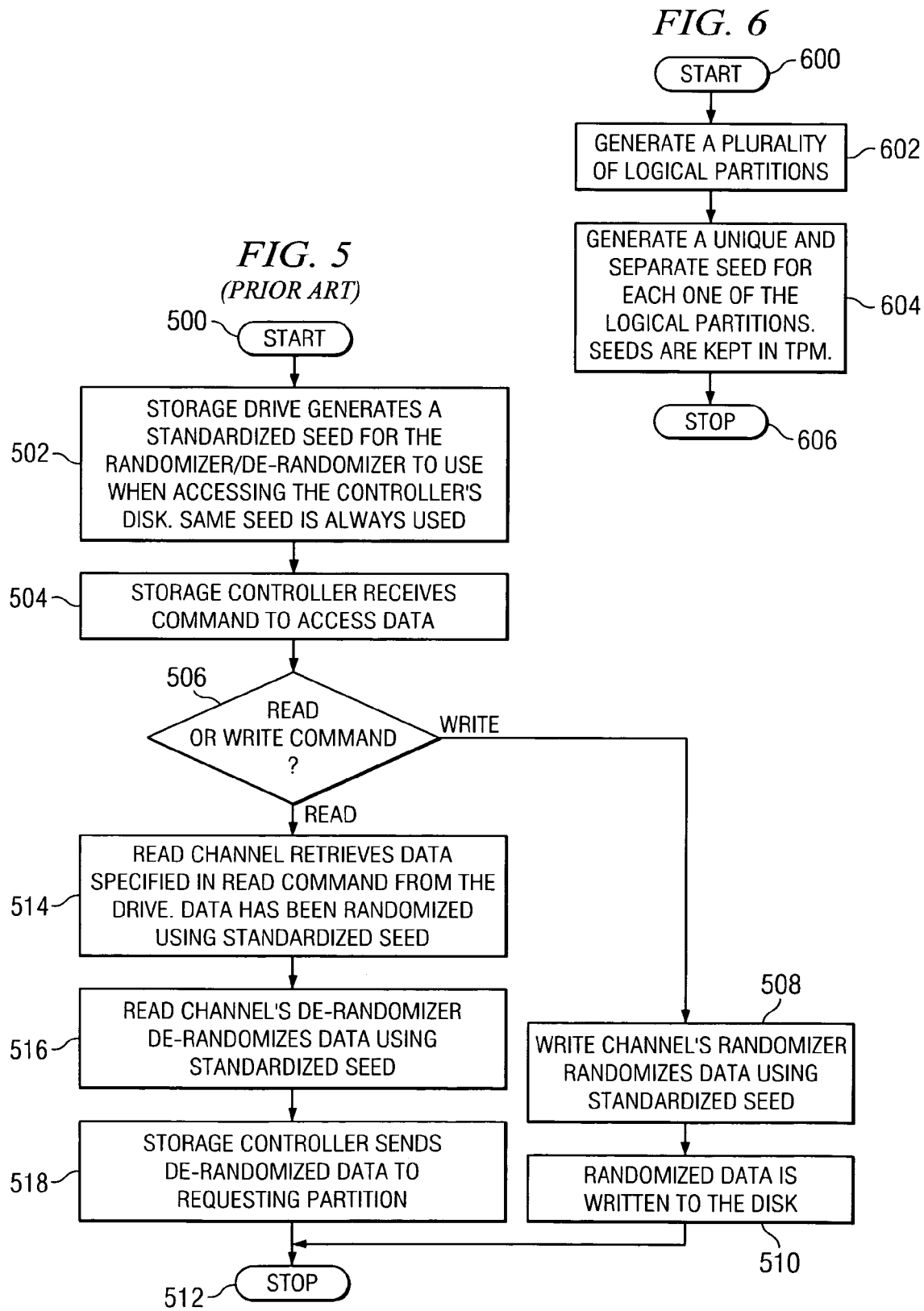

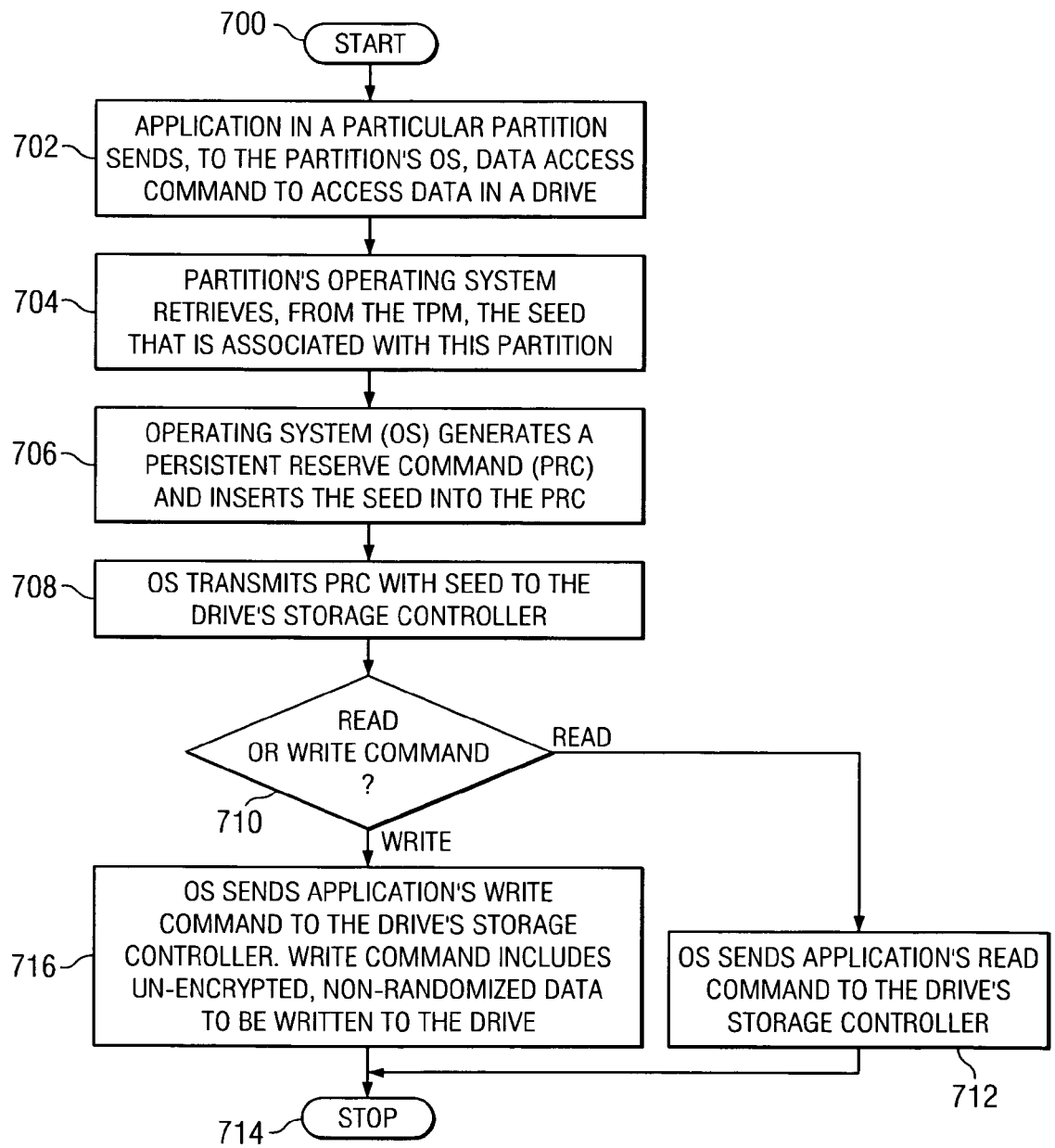

METHOD, APPARATUS, AND PRODUCT FOR PROHIBITING UNAUTHORIZED ACCESS OF DATA STORED ON STORAGE DRIVES

BACKGROUND OF THE INVENTION

1. Field of the Invention

The invention relates to the field of data processing systems, and more specifically to a method, apparatus, and product for prohibiting unauthorized access of data that is stored on storage drives.

2. Description of the Related Art

As is well known to those of ordinary skill in the art, certain binary sequences or patterns are to be avoided when writing binary data to a magnetic recording disk, since these binary patterns stress the ability of the head/disk interface to accurately position the magnetic transitions at the desired positions linearly along the track surface of the disk. In order to avoid these patterns, it is known in the art to randomize data prior to writing the data to the disk. The data is then de-randomized upon subsequently reading the randomized data from the disk.

In known storage drives, a standardized seed is used by the storage drive when reading or writing data regardless of the process, application, or partition that requests the read/write access. This seed is generated within the storage drive itself for use by the storage drive's randomizer/de-randomizer. When a request is received by the storage drive to write data, the randomizer uses the storage drive's seed to randomize the data. The randomized data is then written to the storage drive. When a request is received by the storage drive to read data, the de-randomizer uses the same seed to de-randomize the retrieved randomized data.

This same seed is used whenever a request to read or write is received. Therefore, all applications and partitions that write data to the storage drive will have their data randomized using the same seed. Conversely, when data is requested by any application to be read from the storage drive, the requested data is de-randomized using the same seed.

In the prior art, the seed is selected by the storage drive. The seed is kept within the storage drive. The seed is not unique to any particular application, process, partition, or operating system. Thus, all data on the storage drive is randomized using the same seed. Therefore, all of the data can be de-randomized using the same seed.

The seed of the prior art is a method for eliminating read/write errors when accessing a storage drive. The seed is not used as a security device to protect the data on the storage drive because any process can access the data by transmitting an access command to the storage drive.

Storage drives can be removed from one computer system and inserted into a different computer system where the data stored on the drive can then be accessed. This may be necessary in order to repair a drive. The drive may be removed from its computer system and then sent to a repair facility which then has access to the drive's data. Because the standardized seed is stored within the storage drive, once the drive is removed, its data can be accessed and is not protected. In order to access the data on a typical drive, an appropriate access command is sent to the drive. The drive then uses the standardized seed that is stored in the drive to de-randomize the data that is stored on the drive. Thus, the data on a drive that is inserted into a different computer system can be easily accessed.

The ability to protect a data processing system is limited by the manner in which trust is created or rooted within the data processing system. To address the issues of protecting data processing systems, a consortium of companies has formed the Trusted Computing Group (TCG) to develop and to promulgate open standards and specifications for trusted computing. According to the specifications of the Trusted Computing Group, trust within a given data processing system or trust between a data processing system and another entity is based on the existence of a hardware component within the data processing system that has been termed the trusted platform module (TPM).

A need exists for a method, apparatus, and computer program product for prohibiting unauthorized access of data that is stored on storage drives.

SUMMARY OF THE INVENTION

A method is disclosed in a data processing system for prohibiting unauthorized access of data that is stored on storage drives. Multiple logical partitions are generated. A different unique randomizer seed is generated within a host computer system and associated with each one of the logical partitions. In response to one of the logical partitions needing to access a storage drive, the logical partition transmits a seed to the storage drive. The transmitted seed is associated with the one of the logical partitions. A transmitting one of the logical partitions is unable to transmit a seed that is other than a seed that is associated with the transmitting one of the logical partitions. Thus, a logical partition is capable of transmitting only the seed that is associated with that logical partition and is not capable of transmitting a seed that is associated with another logical partition. The storage drive utilizes the transmitted seed to randomize and de-randomize data for the one of the logical partitions. Data randomized for one of the logical partitions cannot be de-randomized for a different one of the logical partitions. In this manner, the present invention protects the data of one logical partition in a computer system from access by other logical partitions.

In addition to protecting a logical partition's data from other logical partitions, the present invention also protects the data that is stored on a drive from unauthorized access when that drive is removed from its computer system. Because randomizer seed are not stored within the drive itself, the data that is stored in the drive cannot be accessed by unauthorized processes and/or partitions when the drive is removed. Only the logical partition that has the randomizer seed that was used to randomize data that is stored on the drive can later access that data.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 illustrates a high level flow chart that depicts randomizing data in a storage drive using a randomizer seed that was selected by the storage drive in accordance with the prior art;

FIG. 6 depicts a high level flow chart that illustrates associating a different randomizer seed with each one of the logical partitions where the randomizer seeds are selected by a trusted platform module (TPM) in accordance with the present invention;

FIG. 7 illustrates a high level flow chart that depicts an operating system sending a randomizer seed that is unique to the logical partition that is executing the operating system to a storage drive to use when accessing data for an application in accordance with the present invention.

DETAILED DESCRIPTION OF THE PREFERRED EMBODIMENT

A preferred embodiment of the present invention and its advantages are better understood by referring to the figures, like numerals being used for like and corresponding parts of the accompanying figures.

The present invention is a method, apparatus, and computer program product in a data processing system for prohibiting unauthorized access of data that is stored on storage drives. A different unique randomizer seed is generated for and associated with each one of a plurality of logical partitions. The different randomizer seeds are maintained within a secure device in a host computer system to which a storage drive is coupled.

When an application within a logical partition needs to either read data from or write data to the storage drive, the application sends the appropriate data access request. The operating system in that logical partition then retrieves a copy of the seed that is associated with the logical partition. The operating system is permitted to retrieve only the seed that is associated with the operating system's logical partition. The operating system then transmits a command that includes the seed to the storage drive. Thereafter, the operating system will transmit the application's data access request.

The storage controller in the storage drive will receive the seed and use it to either de-randomize data retrieved from the disk in response to a read or randomize data that is to be stored on the disk in response to a write.

The present invention protects the data that is stored on the storage drive from unauthorized access. Data that is stored on the drive can be accessed only by the logical partition that originally stored the data on the drive. The randomizer seed that is associated with the logical partition that originally stored the data on the drive must be used in order to de-randomize the randomized data.

In this manner, the data that is stored by one logical partition is protected from being accessed by any other logical partition. A logical partition has access to only its own randomizer seed. A logical partition cannot access the randomizer seeds of any other logical partitions. Therefore, logical partitions that exist within the same computer system cannot access data that was stored by a different logical partition.

In addition, the present invention protects the data even when the storage drive is removed from its computer system. All of the randomizer seeds, used to randomize data that is stored on the drive, are stored in the host system. No randomizer seed, used to randomize data that is stored on the drive, is stored on the drive. Therefore, when the storage drive is removed from its computer system and inserted into a new computer system, the new computer system will not have access to the randomizer seeds that were used to randomize the data that is stored on the drive. Thus, unauthorized users or processes cannot gain access to the data that is stored on the drive.

Figure 1A:
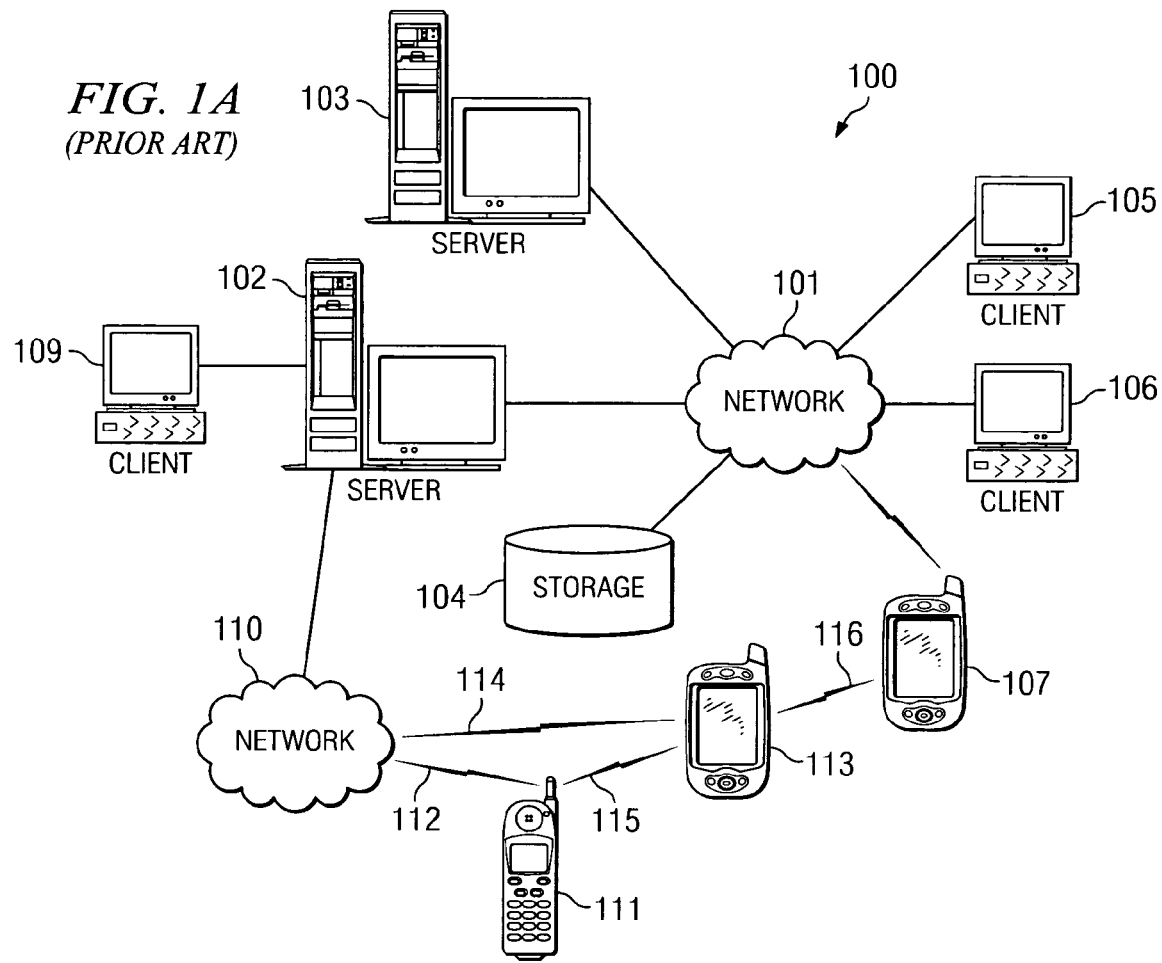
FIG. 1A depicts a typical network of data processing systems, each of which may be used to implement the prior art.

FIG. 1A depicts a network of data processing systems according to prior art. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

Figure 1B:
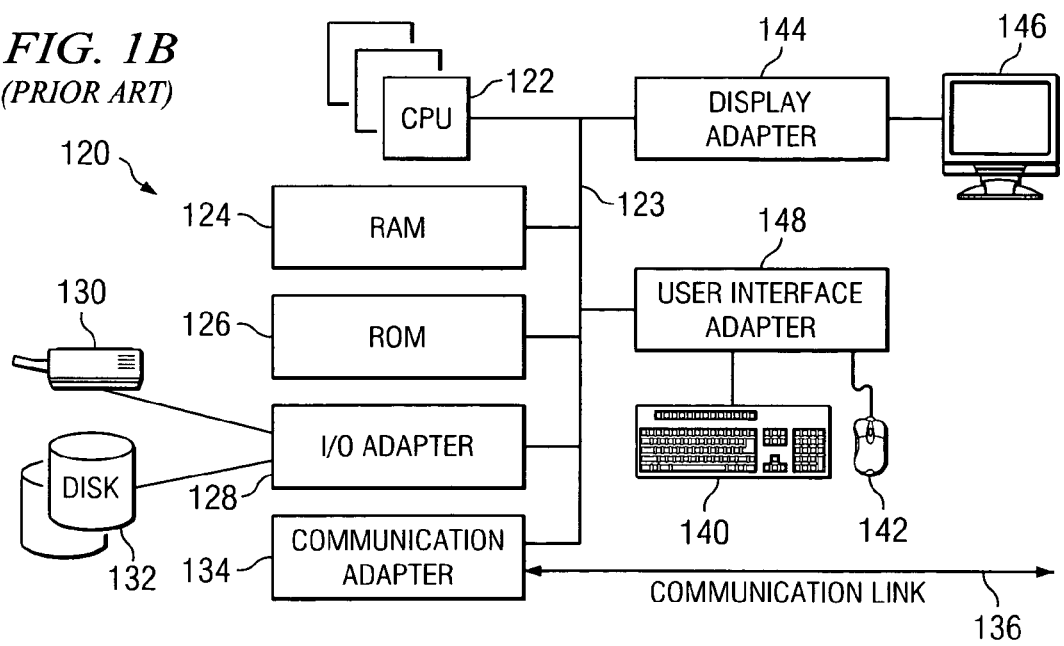
FIG. 1B depicts a computer architecture in accordance with the prior art.

FIG. 1B depicts a computer architecture according to the prior art in which the present invention may be included. Host computer system 120 contains one or more central processing units (CPUs) 122 connected to internal system bus 123, which interconnects random access memory (RAM) 124, read-only memory 126, and input/output adapter 128, which supports various I/O devices, such as printer 130, storage drives such as disk drives 132, or other devices not shown, such as an audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

Figure 1C:
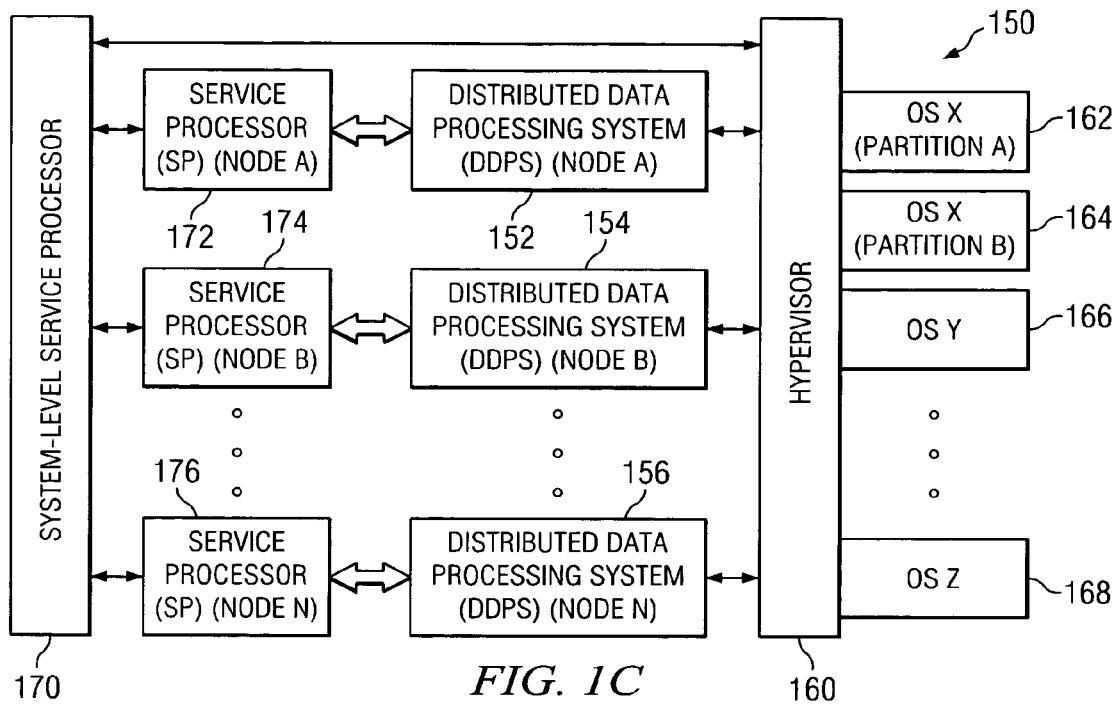
FIG. 1C depicts a block diagram a data processing system in accordance with the prior art.

FIG. 1C depicts a distributed data processing system in accordance with the prior art in which the present invention may be included. Distributed data processing system 150 contains multiple nodes 152-156, each of which may represent a single-processor or multi-processor device or card connected to a communication switch or a network; nodes 152-156 may be implemented as central electronic complex (CEC) units. Hypervisor 160 supports multiple instances of one or more operating systems and/or operating system partitions 162-168 on the shared computational resources of the distributed data processing nodes of system 150. Hypervisor 160 communicates with system-level service processor 170, which is responsible for booting system 150 and for monitoring the availability of the shared resources. Each distributed data processing node is associated with at least one service processor, e.g., service processors 172-176, each of which is responsible for booting its associated node and for assisting system-level service processor 170 in monitoring each of the nodes; a service processor may be associated with a node through a variety of physical connections to its associated node, e.g., the service processor's hardware card may attach to a PCI bus. It should be noted that each node may have a plurality of service processors, although only one service processor would be responsible for booting its associated node.

The present invention could be implemented on a variety of hardware platforms and computational environments; FIG. 1A, FIG. 1B, and FIG. 1C are intended as examples of a heterogeneous computing environment and not as architectural limitations for the present invention.

In addition to being able to be implemented on a variety of hardware platforms and computational environments, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

Figure 1D:
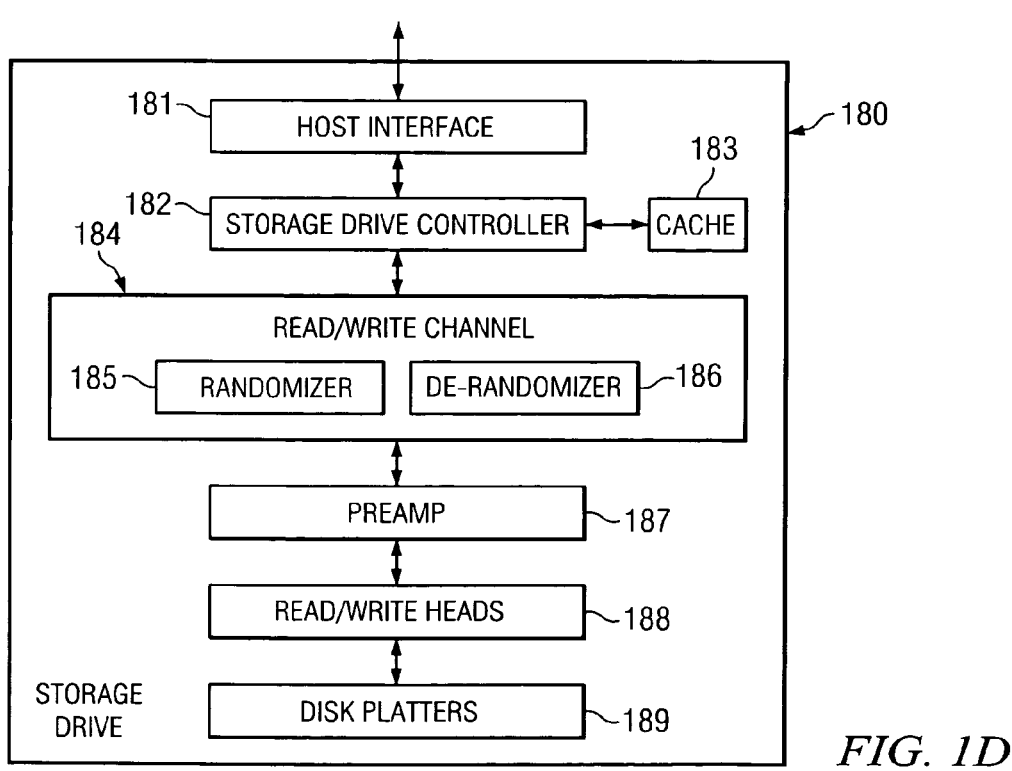
FIG. 1D is a simplified block diagram of a storage drive, such as a disk drive, that includes the present invention in accordance with the present invention.

FIG. 1D is a simplified block diagram of a storage drive 180, such as a disk drive, that includes the present invention in accordance with the present invention. Storage drive 180 communicates with a host computer system via a host interface 181. Requests, such as read commands or write commands, are sent from host interface 181 to storage drive controller 182 which has access to a cache 183. Storage drive controller 182 transmits commands to a read/write channel 184 that is capable of reading data from and writing data to the disk platters 189 via preamplifier 187 and read/write heads 188.

Read/write channel 184 includes a write channel that includes randomizer 185 and a read channel that includes de-randomizer 186. When storage drive controller 182 receives a Persistent Reserve Command (PRC), storage drive controller 182 will extract a seed from the PRC. This seed was inserted into the PRC by the logical partition that transmitted the PRC. The seed inserted by the logical partition is the seed that the partition retrieved from a secure device, such as a trusted platform module (TPM). A logical partition is permitted to retrieve a copy of the seed that was generated for and associated with that logical partition. A logical partition is not permitted to access and/or receive a copy of another logical partition's seed.

When storage drive controller 182 receives a PRC, storage drive controller 182 extracts the seed from the PRC and provides the seed to read/write channel 184. Thereafter, storage drive 180 will receive an access command from the same logical partition.

When this access command is a write command, storage randomizer 185 uses the extracted seed to randomize the data that is included in the write command to be written to disk platters 189.

When this access command is a read command, storage de-randomizer 186 uses the extracted seed to attempt to de-randomize the randomized data requested to be read from disk platters 189. If this same logical partition wrote this data to storage drive 180, de-randomizer 186 will be able to de-randomize the data using the extracted seed. If another logical partition wrote the data, de-randomizer 186 will not be able to de-randomize the data using the extracted seed because the other logical partition's seed was used to randomize the data.

Figure 1E:
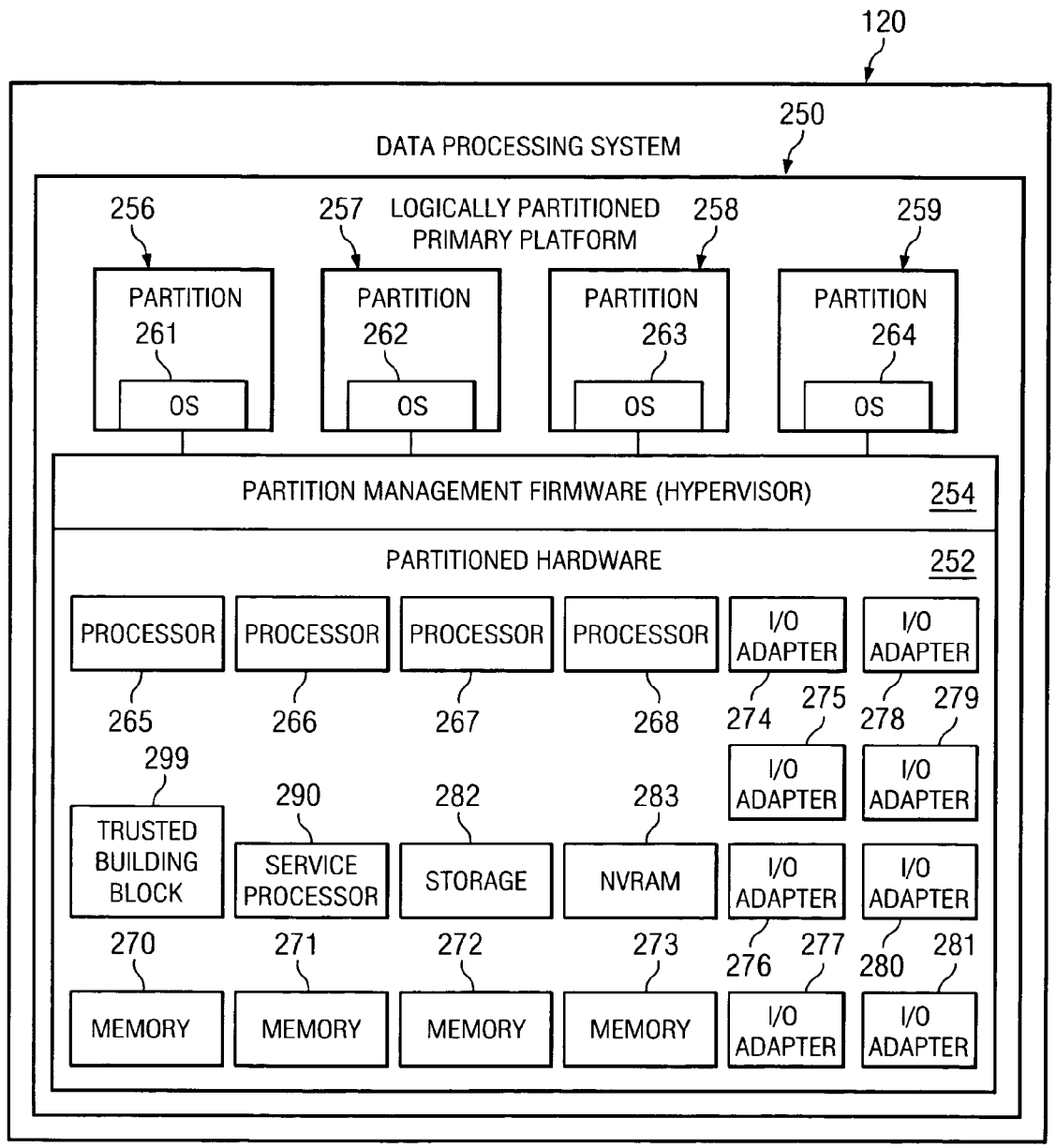
FIG. 1E is a block diagram that illustrates a data processing system that includes multiple different logical partitions in accordance with the present invention.

FIG. 1E is a block diagram of a logically partitioned primary platform that includes the present invention. Logically partitioned primary platform 250 includes partitioned hardware 252, partition management firmware, also called a hypervisor 254, and partitions 256-259. Operating systems 261-264 exist within partitions 256-259. Operating systems 261-264 may be multiple copies of a single operating system or multiple heterogeneous operating systems simultaneously run on platform 250.

Partitioned hardware 252 includes a plurality of processors 265-268, a plurality of system memory units 270-273, a plurality of input/output (I/O) adapters 274-281, and a storage unit 282. Each of the processors 265-268, memory units 270-273, NVRAM storage 283, and I/O adapters 274-281 may be assigned to one of multiple partitions 256-259.

Hypervisor 254 is responsible for partitioning the primary platform 250. Partition management firmware (hypervisor) 254 performs a number of functions and services for partitions 256-259 to create and enforce the partitioning of logically partitioned primary platform 250. Hypervisor 254 is a firmware implemented virtual machine identical to the underlying hardware. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM). Thus, hypervisor 254 allows the simultaneous execution of independent OS images 261-264 by virtualizing all the hardware resources of logically partitioned platform 250. Hypervisor 254 may attach I/O devices through I/O adapters 274-281 to single virtual machines in an exclusive mode for use by one of OS images 261-264.

Data processing system 120 includes service processor 290. A service processor is a separate hardware partition within system 120 that executes its own operating system.

A trusted building block 299, which includes one or more hardware trusted platform modules, may also be included within platform 250.

Figure 2:
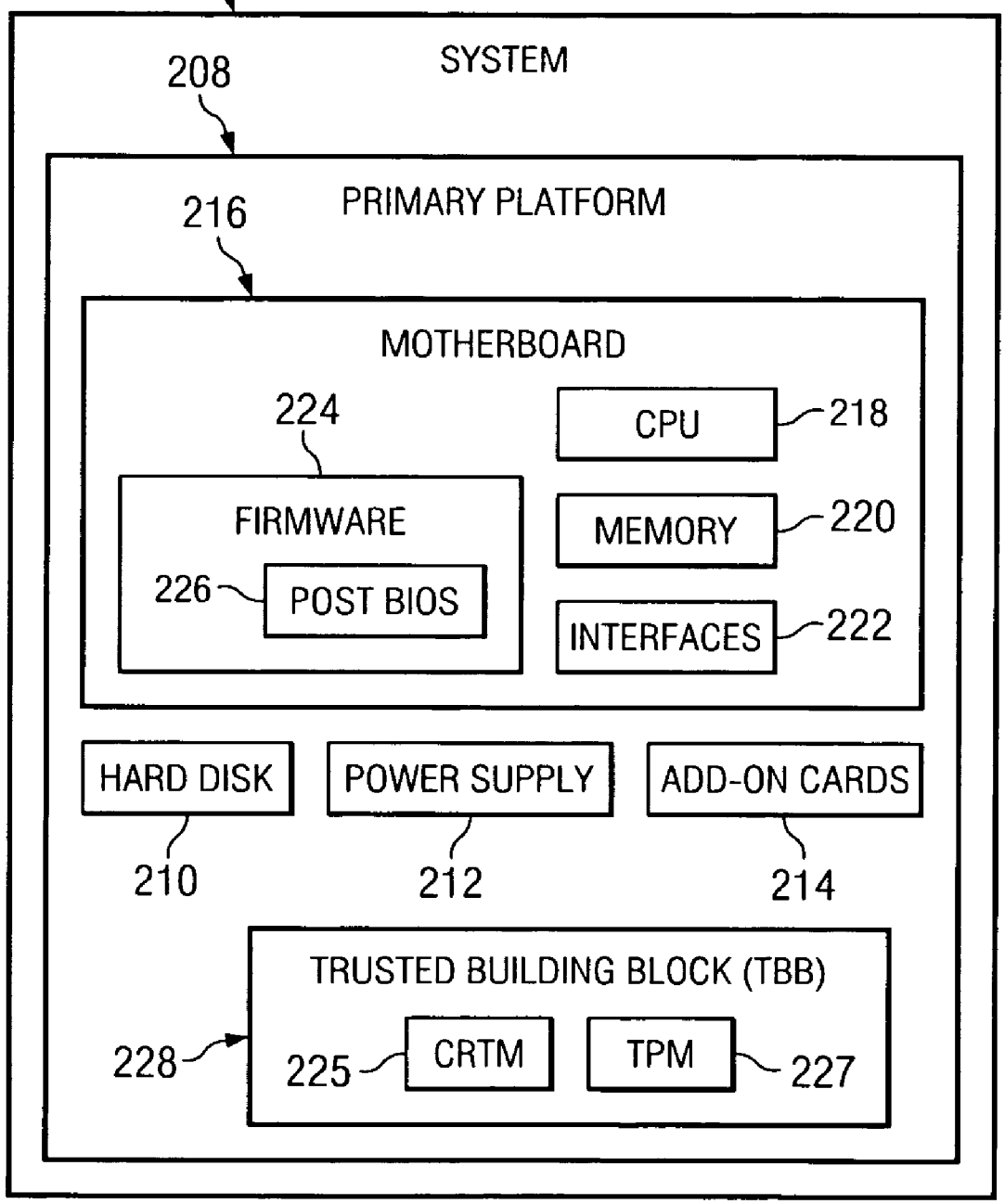
FIG. 2 is a block diagram of a modified hardware trusted platform architecture in accordance with the present invention.

FIG. 2 depicts a trusted platform architecture that has been modified according to the present invention. Except as noted below with regard to the present invention, the remaining components of the TPM operate in accordance with the TCG's PC-specific implementation specification.

A TBB comprises the combination of the core root of trust for measurement (CRTM) component, a secure device such as a trusted platform module (TPM), the connection of the CRTM to motherboard 216, and the connection of the TPM to motherboard 216. For example, TBB 228 includes TPM 227 and CRTM 225.

A TBB provides trust to one of the platforms of system 120. A TBB includes its own CRTM. A CRTM is an immutable portion of a platform's initialization code that executes upon a platform reset. This is the platform for which the TBB that includes the CRTM provides its services.

The platform's execution must begin at the CRTM upon any platform reset event. In this manner, the trust in the platform is based on the CRTM and the behavior of the TPM, and the trust in all measurements is based on the integrity of the CRTM.

For example, the BIOS may be assumed to include a BIOS Boot Block and POST BIOS 226; each of these are independent components that can be updated independent of each other, wherein the manufacturer must control the update, modification, and maintenance of the BIOS Boot Block, but a third party supplier may update, modify, or maintain the POST BIOS component. In the example that is shown in FIG. 2, CRTM 225 may be assumed to be the BIOS Boot Block, and the POST BIOS is a measured component of the chain of trust. Alternatively, the CRTM may comprise the entire BIOS.

The software components may be received through a network, such as network 101 that is shown in FIG. 1A, or they may be stored, e.g., on hard disk 210. Platform 208 receives electrical power from power supply 212 for executing the software components on add-on cards 214 and motherboard 216, which includes typical components for executing software, such as CPU 218 and memory 220, although motherboard 216 may include multiple CPUs. Interfaces 222 connect motherboard 216 to other hardware components within system 120, and firmware 224 contains POST BIOS (power-on self-test basic input/output system) 226.

Figure 3:
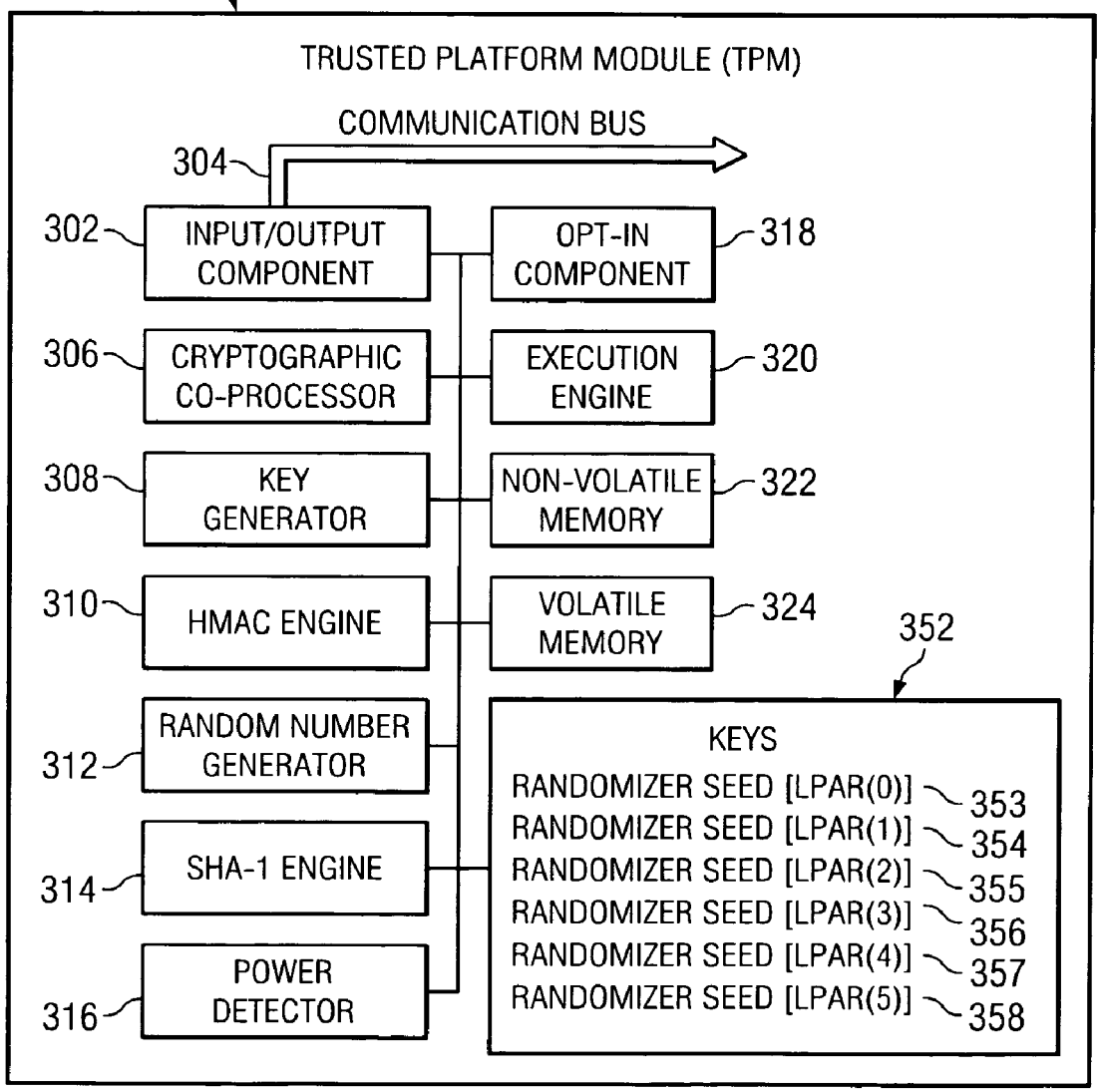
FIG. 3 depicts a block diagram that illustrates a modified hardware trusted platform module (TPM) that includes a unique randomizer seed associated with each logical partition according to the present invention.

FIG. 3 depicts a block diagram that illustrates a trusted platform module (TPM) that may be utilized to implement the hardware TPM described herein in accordance with the present invention.

Trusted platform module 300 comprises input/output component 302, which manages information flow over communications bus 304 by performing appropriate protocol encoding/decoding operations and routing of messages to appropriate components. Cryptographic co-processor 306 performs cryptographic operations within a trusted platform module. Key generator 308 creates symmetric keys and RSA asymmetric cryptographic key pairs. HMAC engine 310 performs HMAC (Keyed-Hashing for Message Authentication) calculations, whereby message authentication codes are computed using secret keys as integrity checks to validate information transmitted between two parties, e.g., in accordance with Krawczyk et al., "HMAC: Keyed-Hashing for Message Authentication", Request for Comments (RFC) 2104, Internet Engineering Task Force (IETF), February 1997.

Random number generator 312 acts as a source of randomness for the computation of various values, such as nonces, keys, or other values. SHA-1 engine 314 implements the SHA-1 hash algorithm. Power detector 316 manages the power states of a trusted platform module in association with the power states of the platform. Opt-in component 318 maintains the state of persistent and volatile flags and enforces semantics associated with those flags such that the trusted platform module may be enabled and disabled. Execution engine 320 runs program code to execute commands that the trust platform module receives through input/output component 302. Non-volatile memory 322 stores persistent identity and state associated with the trusted platform module; the non-volatile memory may store static data items but is also available for storing dynamic data items by entities that are authorized by the trusted platform module owner, whereas volatile memory 324 stores dynamic data items.

Encryption keys 352 are stored within TPM 300. Various encryption keys may be utilized by TPM 300 in order to authenticate another device and/or to communicate with another device. Although encryption keys 352 are depicted separately from the other components of the TPM, the various encryption keys will typically be stored in non-volatile memory 322.

According to the present invention, a separate, unique randomizer seed is stored in keys 352 for each logical partition. For example, a randomizer seed 353 is associated with logical partition LPAR(0) 404. A, randomizer seed 354 is associated with logical partition LPAR(1) 406. A randomizer seed 355 is associated with logical partition LPAR(2) 408. A randomizer seed 356 is associated with logical partition LPAR(3) 410. A randomizer seed 357 is associated with logical partition LPAR(4) 412. A randomizer seed 358 is associated with logical partition LPAR(5) 414. Randomizer seeds 353-358 are each unique and different from each other.

A copy of a randomizer seed may be obtained from the TPM by only that logical partition that is associated with the particular randomizer seed. For example, only logical partition 414 can get a copy of seed 358. None of the other logical partitions can get a copy of that seed.

Figure 4:
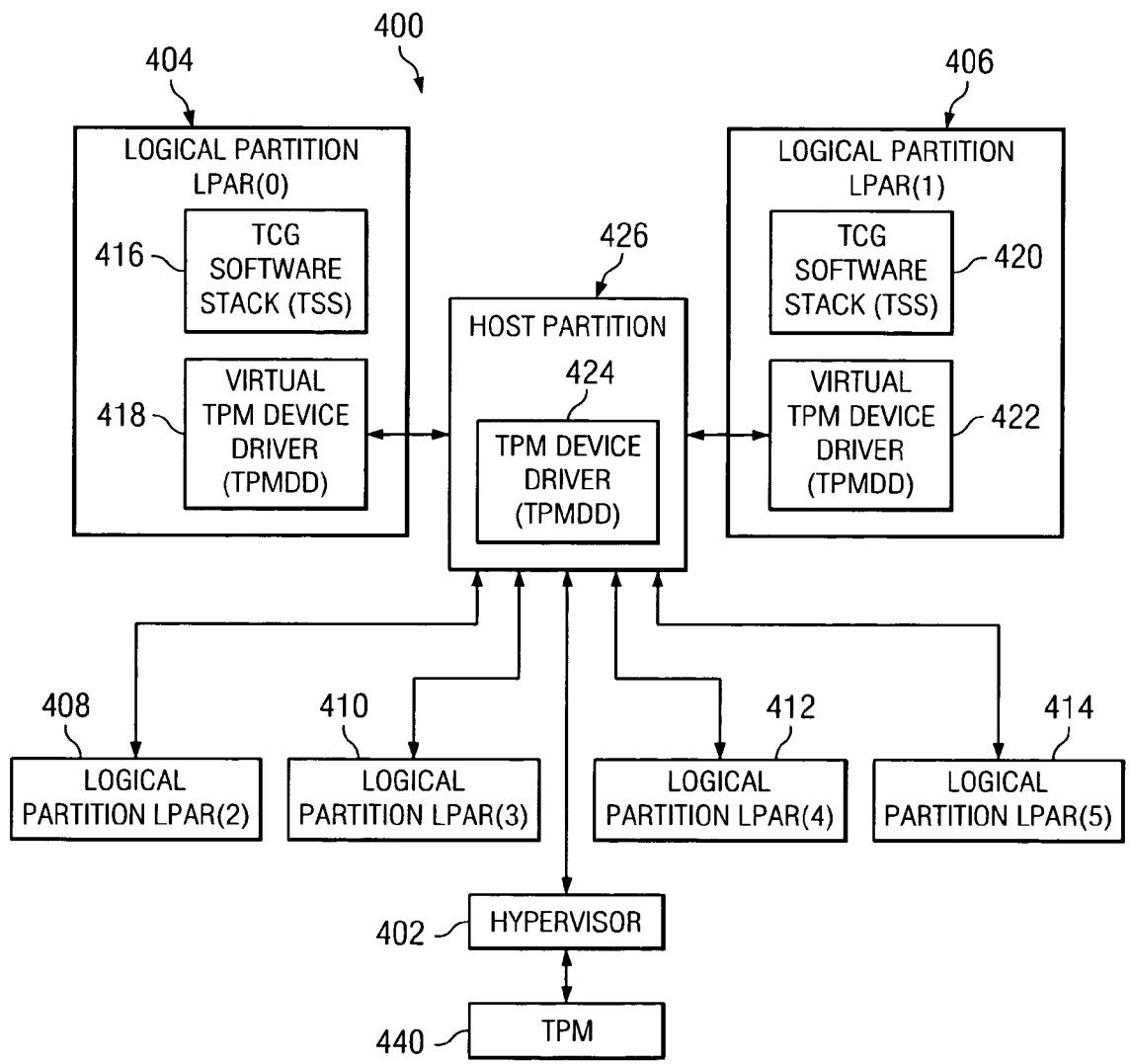
FIG. 4 depicts a block diagram that illustrates a hardware TPM that provides trust to logical partitions in accordance with the present invention.

FIG. 4 depicts a block diagram that illustrates a hardware TPM that provides trust to a number of logical partitions in accordance with the present invention. Data processing system 400 contains a hypervisor 402 that supports multiple instances of one or more operating systems and/or logical partitions (LPAR) on the shared computational resources of data processing system 400. For example, hypervisor 402 supports LPARs 404, 406, 408, 410, 412, and 414.

Each LPAR includes a virtual TPM which includes a TCG software stack (TSS) and a TPM device driver (TPMDD). Each virtual TPM is generated for a logical partition by the hypervisor. For example, LPAR 404 includes TSS 416 and TPMDD 418, while LPAR 406 includes TSS 420 and TPMDD 422. The other LPARs also include a virtual TPM that includes its own TSS and TPMDD that are not depicted. TSS 416 and TSS 420-implement the specification of the host programming interfaces that an operating system, an application, or other software component utilizes to interface with a TPM. TSS comprises: the TSS service provider, to which an entity may interface via common application programming interfaces (APIs); the TSS core services, which provides centralized management of key storage, contexts, and handles the direct interaction with the TPM on the host.; and the TPM device driver library and the TPMDD, such as TPMDD 418 or TPMDD 422. Generally, all interfacing to the TPM occurs through TSS service provider interface (TSPI) or an API above the TSPI.

Hypervisor 402 is firmware that is responsible for creating and enforcing the partitioning of platform 208, 250 among the various partitions. Hypervisor 402 provides a set of firmware services to the operating system in each partition so that interference between operating system images is prevented. Each partition includes an operating system executing in that partition that may be the same as or different from the operating system that is executing in the other logical partitions. Hypervisor 402 manages the logical partitions, and allocates and manages the physical devices that are allocated to each partition.

FIG. 5 illustrates a high level flow chart that depicts randomizing data in a storage drive using a randomizer seed that was selected by the storage drive in accordance with the prior art. The process starts as depicted by block 500 and thereafter passes to block 502 which illustrates a storage drive generating a standardized seed to use for randomizing and de-randomizing data within the controller's disk. The same standardized seed is used regardless of which process, application, and/or partition is accessing the storage drive. This randomizer seed is stored within the storage drive. Next, block 504 depicts a storage controller in the storage drive receiving a command to access data using the drive.

Block 506, then, illustrates a determination of whether the command is a read or write command. If a determination is made that the command is a write command, the process passes to block 508 which illustrates the randomizer randomizing, using the standardized seed that was generated by the storage drive, the data included in the write command. Thereafter, block 510 depicts the randomized data being stored on the drive. The process then terminates as illustrated by block 512.

Referring again to block 506, if a determination is made that the command is a read command, the process passes to block 514 which illustrates the read channel retrieving the data specified in the read command from the drive. The data was randomized using the standardized seed. Next, block 516 depicts the de-randomizer of the read channel de-randomizing the data using the standardized seed. This randomizer seed is retrieved from within the storage drive. Thus, the storage drive itself maintains the seed that is necessary to de-randomize data that is stored on its disk. In this manner, if the storage drive is removed from the host computer, any other host computer system can read the data that is stored on the disk because the seed that is necessary to de-randomize the stored data is included within the drive itself. Block 518, then, illustrates the storage controller sending the de-randomized data to the requester. The process then terminates as depicted by block 512.

The process of FIG. 5 is executed any time any application, operating system, process, and/or logical partition needs to either read data from or write data to the storage drive. Thus, the same randomizer seed is used within the storage drive regardless of the identity of the requester. Further, all data that is stored on the storage drive is randomized using the same randomizer seed.

FIG. 6 depicts a high level flow chart that illustrates associating a different randomizer seed with each one of the logical partitions where the randomizer seeds are selected by a trusted platform module (TPM) in accordance with the present invention. The process starts as depicted by block 600 and thereafter passes to block 602 which illustrates generating a plurality of logical partitions. Next, block 604 depicts generating a unique and separate seed for each one of the logical partitions. Each logical partition has its own unique randomizer seed that is associated with the logical partition. The seeds are kept in the TPM. Because the seeds are kept within the TPM, the TPM controls who has access to the seeds. Only the logical partition that is associated with a particular seed can access its seed. The process then terminates as illustrated by block 606.

FIG. 7 illustrates a high level flow chart that depicts an operating system sending a randomizer seed that is unique to the logical partition that is executing the operating system to a storage drive to use when accessing data for an application in accordance with the present invention. The process starts as illustrated by block 700 and thereafter passes to block 702 which depicts an application in a particular partition sending a data access command to that partition's operating system. The command is to access data in a particular storage drive. The command can be a command to read particular data or write data to the drive.

The process then passes to block 704 which illustrates the partition's operating system retrieving the seed that is associated with this partition. The seed is requested and retrieved from the TPM. The logical partition can retrieve only its own seed from the TPM. Next, block 706 depicts the operating system generating a Persistent Reserve Command (PRC) and inserting the seed into the PRC.

The following tables include a definition for a PRC that can be used according to the present invention.

The Persistent Reserve Out Command is Defined as:

| Byte | Bit | | | | | | | |
|------|---|---|---|---|---|---|---|---|
|  | 7 | 6 | 5 | 4 | 3 | 2 | 1 | 0 |
| 0 | Command Code = 5Fh | | | | | | | |
| 1 | Reserved = 0 | | | | Service Action | | | |
| 2 | Scope | | | | Type | | | |
| 3-6 | Reserved = 0 | | | | | | | |
| 7-8 | (MSB) Allocation Length (LSB) | | | | | | | |
| 9 | VU = 0 | | | Reserved = 0 | | | Flag | Link |

The Service Action Field is Defined as:

| Code | Name | Description |
|------|------|-------------|
| 00h | Register | Register a reservation Key with the device server |
| 01h | Reserve | Create a persistent reservation using a reservation key |
| 02h | Release | Release a persistent Reservation |
| 03h | Clear | Clear all reservation keys and all persistent reservations |
| 04h | Preempt | Preempt persistent reservations from another Initiator |
| 05h | Preempt and Abort | Preempt persistent reservations from another Initiator and clear the task set for the preempted Initiator |
| 06h | Register and Ignore existing key | Register a reservation key with the drive |

The Scope Field is Defined as:

| Code | Name | Description |
|---|---|---|
| 0h | LU | Persistent reservation applies to the full logical unit |
| 1h | Extent | Persistent reservation applies to the specific extent |
| 2h | Element | Persistent reservation applies to the specific element |
| 3-Fh | Reserved | Reserved |

Hard drives use the extent Reservation which means that specific ranges of LBA can be reserved by an initiator.

The Type Code Field Definition is:

| Code | Name |
|---|---|
| 0h | Read Shared |
| 1h | Write Exclusive |
| 2h | Read Exclusive |
| 3h | Exclusive Access |
| 4h | Shared Access |
| 5h | Write exclusive Registrants Only |
| 6h | Exclusive Access Registrants Only |
| 7-Fh | Reserved |

For this field a SCSI Initiator would have read and write exclusive access to an extent on.

The Parameter List length field defines the length of the following table:

| Byte | Definition |
|---|---|
| 0-7 | (MSB) Reservation Key (LSB) |
| 8-15 | Service Action Reservation Key |
| 16-19 | Scope Specific Address |
| 20-21 | Reserved |
| 22-23 | Extent Length |

Where:
1. The reservation Key can be used as the Randomizer seed.
2. The Service Action Reservation Key is the key for the initiator requesting the Persistent Reserve Out Command.
3. The Scope Specific Address is the starting LBA of the extent.
4. The Extent length is the length of the extent field.

Block 708, then, illustrates the operating system transmitting the PRC, including the seed, to the drive's storage controller. Thereafter, block 710 depicts a determination of whether the command is a read command or a write command. If a determination is made that the command is a read command, the process passes to block 712 which illustrates the operating system sending the application's read command to the drive's storage controller. The process then terminates as depicted by block 714. Referring again to block 716, if a determination is made that the command is a write command, the process passes to block 716 which illustrates the operating system sending the application's write command to the drive's storage controller. The write command includes un-encrypted and non-randomized data to be written to the drive. The process then terminates as depicted by block 714.

Figure 8:
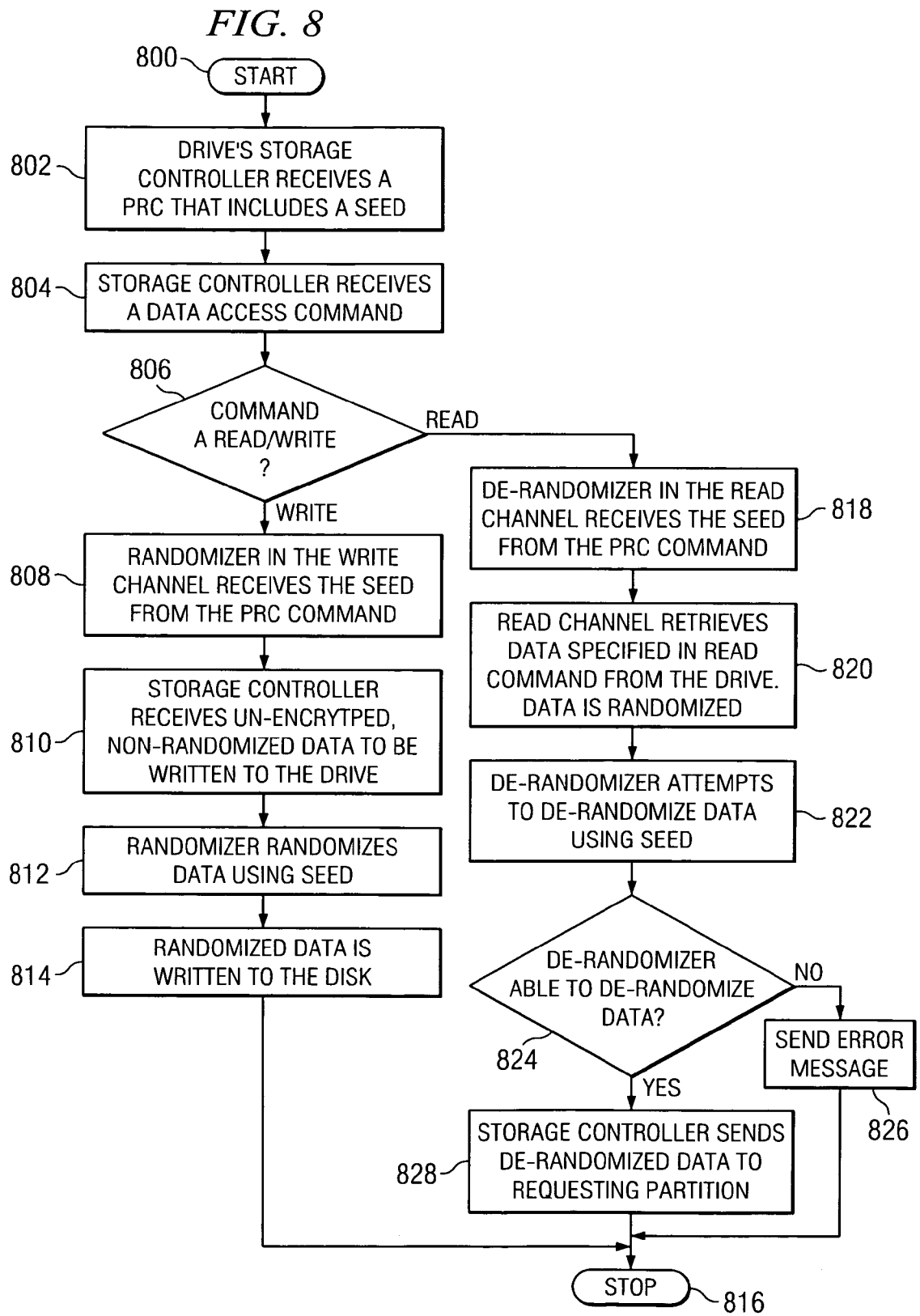
FIG. 8 depicts a high level flow chart that illustrates a storage drive using a randomizer seed received from an operating system in a particular partition when accessing data for an application in accordance with the present invention.

FIG. 8 depicts a high level flow chart that illustrates a storage drive using a randomizer seed received from an operating system in a particular partition when accessing data for an application in accordance with the present invention. The process starts as depicted by block 800 and then passes to block 802 which illustrates a drive's storage controller receiving a PRC that includes a seed. Next, block 804 depicts the storage controller receiving a data access command.

Block 806, then, illustrates a determination of whether or not the command is a read command or a write command. If a determination is made that the command is a write command, the process passes to block 808 which depicts the randomizer in the write channel receiving the seed that was included in the PRC command. Thereafter, block 810 illustrates the storage controller receiving the un-encrypted, non-randomized data that is to be written to the drive. This un-encrypted, non-randomized data is included in the write command. The process then passes to block 812 which depicts the randomizer randomizing the data using the seed that was included in the PRC command. Once the seed is used, it is not kept within the drive. Thus, the storage drive includes no stored randomizer seed that was used to randomize data this is stored on the drive. Next, block 814 illustrates the randomized data being written to the disk. The process then terminates as depicted by block 816.

Referring again to block 806, if a determination is made that the command is a read command, the process passes to block 818 which depicts the de-randomizer in the read channel receiving the seed that was included in the PRC command. Next, block 820 illustrates the read channel retrieving the data from the drive that was specified in the read command. This data was randomized before it was stored in the drive.

Block 822, then, depicts the de-randomizer attempting to de-randomize the data using the seed that was included in the PRC command. Once the seed is used, it is not kept within the drive. Thereafter, block 824 illustrates a determination of whether or not the de-randomizer was able to the de-randomize the data using the seed that was included in the PRC command. If the same partition caused this data to be stored in the drive, the de-randomizer will be able to de-randomize the data with the seed received in the PRC because this partition will have sent the same seed used to randomize the data. If a different partition caused this data to be stored in the drive, the de-randomizer will not be able to de-randomize the data with the seed received in the PRC because this partition will have sent a different seed from the seed that used to randomize the data. If a determination is made that the de-randomizer was not able to de-randomize the data, the process passes to block 826 which depicts sending an error message to the requesting partition. The process then terminates as illustrated by block 816.

Referring again to block 824, if a determination is made that the de-randomizer was able to de-randomize the data, the process passes to block 828 which depicts the storage controller sending the de-randomized data to the requesting partition. The process then terminates as illustrated by block 816.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a computer system, which includes a host coupled to a disk drive, for prohibiting unauthorized access of data that is stored on said disk drive, wherein said disk drive communicates with said host using a disk drive controller that is included in the disk drive, and wherein said disk drive controller forwards read requests and write requests to a read/write channel that is included in the disk drive, and further wherein said read/write channel includes a randomizer and a de-randomizer; said method comprising:

generating a plurality of logical partitions in said host;
    associating a different unique randomizer seed with each one of said plurality of logical partitions;
    keeping said seed in a trusted platform module that is included said host, wherein said trusted platform module does not exist within any of said plurality of logical partitions, and wherein said seed is not stored within said disk drive;
    controlling, by said trusted platform module, access to said different unique randomizer seed associated with each one of said plurality of logical partitions, wherein only one of said plurality of logical partitions associated with an associated seed can access said associated seed;
    utilizing a first seed that is associated with a first one of said logical partitions to limit access to first data, which was stored by said first one of said plurality of logical partitions in the disk drive, to only said first one of said plurality of logical partitions, wherein other ones of said plurality of logical partitions that are not associated with said first seed are unable to access said first data;
    sending, by an application in said first one of said plurality of logical partitions to a first operating system that is being executed by said first one of said plurality of logical partitions, a data access command to access data in said disk drive;
    retrieving, by said first operating system, said first seed;
    sending, by the host to said disk drive in a read request, a particular read seed to be used by said de-randomizer to attempt to de-randomize data, which is stored on said disk drive; and
    sending, by the host to said disk drive in a write request, a particular write seed to be used by said randomizer to randomize data, wherein said particular write seed is provided to said randomizer by said disk drive controller.

2. The method according to claim 1, further comprising:
    transmitting, by said first operating system using a first command, particular data to be stored in said disk drive;
    transmitting, by said first operating system using a second command to said disk drive, said first seed that is associated with said first one of said plurality of logical partitions;
    randomizing, by said randomizer, said transmitted particular data utilizing said first seed; and
    storing, by said disk drive, said randomized data in said disk drive.

3. The method according to claim 2, further comprising:
    transmitting, by a second operating system that is being executed by a second one of said logical partitions, second data to be stored in said disk drive;
    transmitting, by said second operating system to said disk drive, a second seed that is associated with said second one of said plurality of logical partitions;
    randomizing, by said randomizer, said transmitted second data utilizing said second seed; and
    storing, by said disk drive, said randomized second data in said disk drive.

4. The method according to claim 2, further comprising:
    transmitting a request, by said first operating system, to read said randomized data that is stored in said disk drive;
    transmitting, by said first operating system, said first seed that is associated with said first one of said plurality of logical partitions;

de-randomizing, by said de-randomizer, said randomized data utilizing said first seed; and transmitting, by said disk drive, said de-randomized data to said first one of said plurality of logical partitions.

5. The method according to claim 2, further comprising:

transmitting a request, by a third operating system that is being executed by a third one of said plurality of logical partitions, to read said randomized data that is stored in said disk drive;

transmitting, by said third operating system, a third seed that is associated with said third one of said plurality of logical partitions;

attempting, by said de-randomizer, to de-randomize said randomized data utilizing said third seed that is associated with said third one of said plurality of logical partitions;

in response to de-randomizing said randomized data utilizing said third seed that is associated with said third one of said plurality of logical partitions, transmitting, by said disk drive, said de-randomized data to said third one of said plurality of logical partitions, wherein said first seed is the same as said third seed; and in response to being unable to de-randomize said randomized data utilizing said third seed that is associated with said third one of said plurality of logical partitions, transmitting, by said disk drive, an error message to said third one of said plurality of logical partitions.

6. The method according to claim 1, further comprising:

a transmitting one of said plurality of logical partitions being unable to transmit a seed that is not associated with said transmitting one of said plurality of logical partitions.

7. A computer implemented method in a computer system, which includes a host coupled to a disk drive, for prohibiting unauthorized access of data that is stored on said disk drive, wherein said disk drive communicates with said host using a disk drive controller that is included in the disk drive, and wherein said disk drive controller forwards read requests and write requests to a read/write channel that is included in the disk drive, and further wherein said read/write channel includes a randomizer and a de-randomizer; said method comprising:

generating a plurality of logical partitions in said host;

associating a different unique randomizer seed with each one of said plurality of logical partitions;

keeping said seed in a trusted platform module that is included said host, wherein said trusted platform module does not exist within any of said plurality of logical partitions, and wherein said seed is not stored within said disk drive;

controlling, by said trusted platform module, access to said different unique randomizer seed associated with each one of said plurality of logical partitions, wherein only one of said plurality of logical partitions associated with an associated seed can access said associated seed;

utilizing a first seed that is associated with a first one of said logical partitions to limit access to first data, which was stored by said first one of said plurality of logical partitions in the disk drive, to only said first one of said plurality of logical partitions, wherein other ones of said plurality of logical partitions that are not associated with said first seed are unable to access said first data;

sending, by an application in said first one of said plurality of logical partitions to a first operating system that is being executed by said first one of said plurality of logical partitions, a data access command to access data in said disk drive;

retrieving, by said first operating system, said first seed;

using said de-randomizer to attempt to de-randomize data, which is stored on said disk drive, using a particular read seed that is provided to said de-randomizer in a read request; and using said randomizer to randomize data, which is provided to said randomizer by said disk drive controller, using a particular write seed that is provided to said randomizer in a write request.

* * * * *